United States Patent

Markyvech

[11] Patent Number: 5,441,464
[45] Date of Patent: Aug. 15, 1995

[54] NON-POWER DOWNSHIFT THROTTLE RECOVERY

[75] Inventor: Ronald K. Markyvech, Allen Park, Mich.

[73] Assignee: Eaton Corporation, Cleveland, Ohio

[21] Appl. No.: 195,001

[22] Filed: Feb. 14, 1994

[51] Int. Cl.$^6$ ............................................. B60K 41/08
[52] U.S. Cl. .................................. 477/109; 477/110; 477/111; 477/92; 364/431.03
[58] Field of Search .................. 477/72, 92, 109, 110, 477/111, 203, 205, 206

[56] References Cited

U.S. PATENT DOCUMENTS

| | | | |
|---|---|---|---|
| 4,361,060 | 11/1982 | Smyth | 74/866 |
| 4,493,228 | 1/1985 | Vukovich et al. | 477/111 X |
| 4,595,986 | 7/1986 | Daubenspeck et al. | 364/424.1 |
| 4,765,201 | 8/1988 | Ishiguro et al. | 477/92 |
| 4,792,901 | 12/1988 | Mack et al. | 364/424.1 |
| 4,850,236 | 7/1989 | Braun | 74/337 |
| 5,053,959 | 10/1991 | Genise | 74/866 |
| 5,053,961 | 10/1991 | Genise | 364/424.1 |
| 5,053,962 | 10/1991 | Genise | 364/424.1 |
| 5,089,965 | 2/1992 | Braun | 364/424.1 |
| 5,109,729 | 5/1992 | Boardman | 74/858 |
| 5,133,227 | 7/1992 | Iwatsuki | 477/109 X |
| 5,136,897 | 8/1992 | Boardman | 74/866 |
| 5,323,667 | 6/1994 | Tweed et al. | 364/424.1 X |

FOREIGN PATENT DOCUMENTS

0238310B1 9/1987 European Pat. Off. .

Primary Examiner—Charles A. Marmor
Assistant Examiner—Nathan O. Jensen
Attorney, Agent, or Firm—Howard D. Gordon

[57] ABSTRACT

A non-power downshift throttle recovery control method/system is provided for vehicular automated mechanical transmission systems of the type including a multiple-speed mechanical transmission (10) coupled to an electronically controlled engine (E) by a master clutch (C). The transmission is shifted without disengagement of the master clutch (C), and the engine is fueled according to at least a first control strategy wherein fueling tracks throttle (P) position or a second control strategy wherein engine fueling is modified to cause engine speed (ES) to equal a target engine speed ($ES_{TARGET}$).

30 Claims, 5 Drawing Sheets

NON-POWER DOWNSHIFT THROTTLE RECOVERY

BACKGROUND OF THE INVENTION

1. Field of Invention

The present invention relates to control methods and systems for controlling fueling of an engine in a vehicular automated mechanical transmission system after completion of a non-power downshift. In particular, the present invention relates to controlling of fueling of an electronically controlled engine (preferably of the type associated with an SAE J 1922 or SAE J 1939 protocol data link) in a vehicular automated mechanical transmission system (preferably of the type shifted without disengagement of the master clutch) during the period of time from completion of jaw clutch engagement of a non-power downshift until control of engine fueling is determined solely by operator positioning of the throttle device.

2. Description of the Prior Art

Fully or partially automated vehicular control systems wherein, for a period of time, fueling of the vehicular engine is controlled by the system controller (usually a microprocessor-based controller), regardless of operator throttle pedal positioning, are well known in the prior art. Examples of such systems include automated transmission systems, traction control systems, anti-lock brake systems and the like. Control strategies for returning control of engine fueling to the operator (i.e., "throttle recovery") also are known in the prior art. See, for example, U.S. Pat. No. 4,792,901, the disclosure of which is incorporated herein by reference.

Fully or semi-automatic transmission systems utilizing electronic control units which sense engine fueling, throttle position, engine, input shaft, output shaft and/or vehicle speed, and utilize automatically controlled fuel throttle devices, gear shifting devices and/or master clutch operating devices to substantially fully automatically implement selected transmission ratio changes are known in the prior art. Examples of such automated mechanical transmission systems may be seen by reference to U.S. Pat. Nos. 4,361,060; 4,425,620; 4,631,679 and 4,648,290, the disclosures of which are incorporated herein by reference.

Another type of partially automated transmission system provides semi-automatic shift implementation for a mechanical transmission system for use in vehicles having an electronically controlled engine and a manually only controlled master clutch. An electronic control unit (ECU) is provided for receiving various signals, such as input signals indicative of transmission input and output shaft speeds, and for processing same in accordance with predetermined logic rules to issue command output signals to an engine fueling controller and a transmission actuator for shifting the transmission in accordance with the command output signals. Transmission systems of this general type may be seen by reference to U.S. Pat. Nos. 5,050,079; 5,053,959; 5,053,961; 5,053,962; 5,063,511; 5,081,588; 5,089,962; and 5,089,965, the disclosures of which are hereby incorporated by reference.

Electronically controlled engines are known and typically provide information to and receive command requests from a data link of the type conforming to the European "CAN" protocol and/or the SAE J 1922 or SAE J 1939 protocol. Such engines have four modes of operation wherein engine fueling is adjusted to:

(1) follow the operator's setting of the throttle device (usually a pedal);

(2) to cause engine torque to equal a requested engine torque;

(3) to cause engine speed to equal a requested engine speed; or (4) to cause engine speed and engine torque to be limited to requested engine speed and torque values, The above modes usually are referred to as the throttle tracking mode, the torque control mode, the speed control mode, and the torque and speed limiting mode, respectively.

While the prior art automated mechanical transmission systems of the type including electronically controlled engines and having a mode of operation wherein shifts are performed without disengagement of the master clutch are generally satisfactory, they were not totally satisfactory, as after the completion of a shift, throttle recovery was attempted by causing the engine to achieve a requested torque, which provided very high quality shifts for upshifts and power downshifts but which tended to cause roughness and/or cab lurch after a non-power downshift (i.e., a downshift when throttle pedal is at or near minimal setting, preferably less than 5-percent displacement).

SUMMARY OF THE INVENTION

In accordance with the present invention, the drawbacks of the prior art are minimized or overcome by the provision of a shift recovery control method/system for a vehicular at least partially automated mechanical transmission system including an electronically controlled engine, and preferably of the type shifted without disengagement of the master clutch, which, after completion of a non-power downshift, will control fueling of the engine until the engine fueling is controlled by tracking the operator's displacement of the throttle pedal without causing driveline harshness or cab lurch.

The above is accomplished, after sensing jaw clutch engagement of a non-power downshift, by causing the engine to operate in its speed control mode to achieve an engine speed equaling a target engine speed, the value of which is continuously, downwardly ramped until the value of the target is less than the actual engine speed (gear ratio×output shaft speed) by a predetermined amount, at which time the engine control is returned to the operator (i.e., the engine is fueled to track throttle pedal position). Actual engine speed exceeding target engine speed by a significant amount (say, about 200 RPM) during the non-power downshift recovery period is an indication that the vehicle is now driving the engine and that allowing fueling to track throttle position (less than 5 percent of full throttle) will not adversely affect shift quality.

There are two general types of non-power downshifts, namely, "coast downshifts" (downshifts with minimal throttle position and brakes not applied) and "braking downshifts" (downshifts with minimal throttle position and brakes and/or retarders, etc., applied). To avoid fighting the brakes during throttle recovery from a braking downshift (sensed by a brake pedal sensor and/or monitoring vehicle acceleration), the target engine speed will be set at a value considerably below the expected engine speed (GR * OS) at current vehicle deceleration (dOS/dt), which value also will be continuously decremented downwardly.

Accordingly, a control system/method for a vehicular automated mechanical transmission system equipped with an electronically controlled engine is provided which will provide a relatively smooth throttle recovery after a non-power downshift.

This and other objects and advantages of the present invention will become apparent from a reading of the detailed description of the preferred embodiment taken in connection with the attached drawings.

DESCRIPTION OF THE PREFERRED EMBODIMENT

Figure 1:
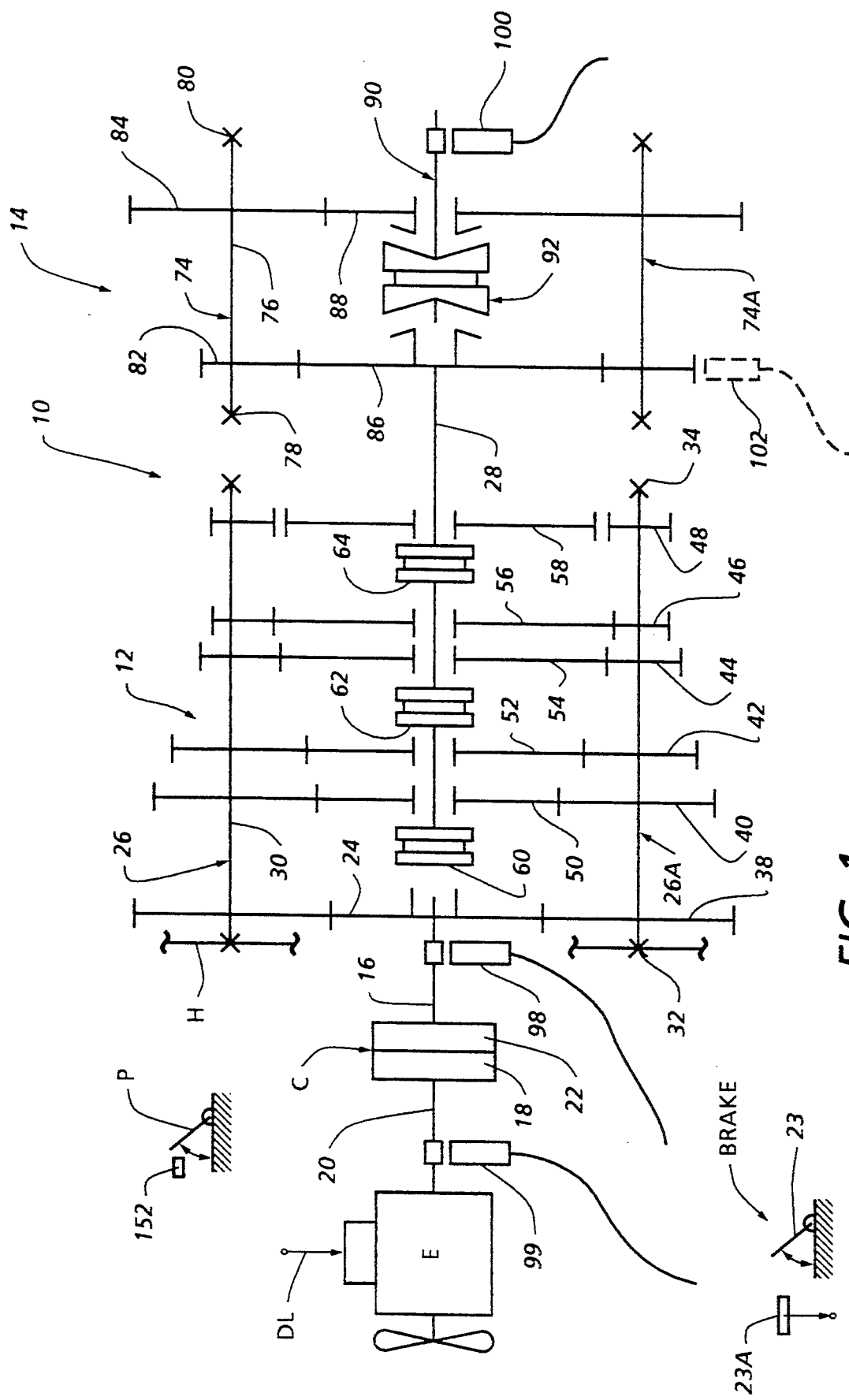
FIG. 1 is a schematic illustration of a partially automated vehicular mechanical transmission system utilizing the after-non-power downshift throttle recovery control of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words specifically mentioned above, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission. A "selected direction" of shifting will refer to selection of either single or multiple upshifting or downshifting from a particular gear ratio.

Referring to FIG. 1, a range type compound transmission 10 in a partially automated semi-automatic mechanical transmission system is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is electronically fuel throttle controlled and is connected to an electronic data link DL of the type defined in SAE J 1922 or J 1939 protocol, and the master clutch C is manually controlled by a clutch pedal (not shown) or the like. A service brake operated by manual pedal 23 is provided, as is well known in the prior art. A sensor 23A may be provided for sensing operation of the brakes and for providing a signal indicative thereof.

Transmissions similar to mechanical transmission 10 are well known in the prior art and may be appreciated by reference to U.S. Pat. Nos. 3,105,395; 3,283,613 and 4,754,665, the disclosures of which are incorporated by reference. Automated vehicular mechanical transmission systems of the general type illustrated may be seen by reference to above-mentioned U.S. Pat. Nos. 5,050,079; 5,053,959; 5,053,961; 5,053,962; 5,063,511 and 5,089,965.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axial positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

Figure 1A:
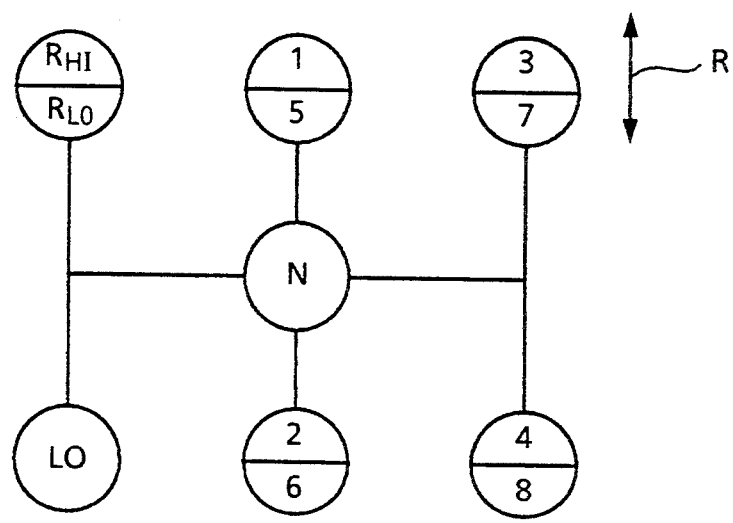
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

For purposes of providing the automatic preselect mode of operation and the semi-automatic shift implementation operation of transmission 10, an input shaft speed (IS) sensor 98, an engine speed (ES) sensor 99, and an output shaft speed (OS) sensor 100 are utilized.

Engine speed also may be provided on data link DL. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90.

Figure 2:
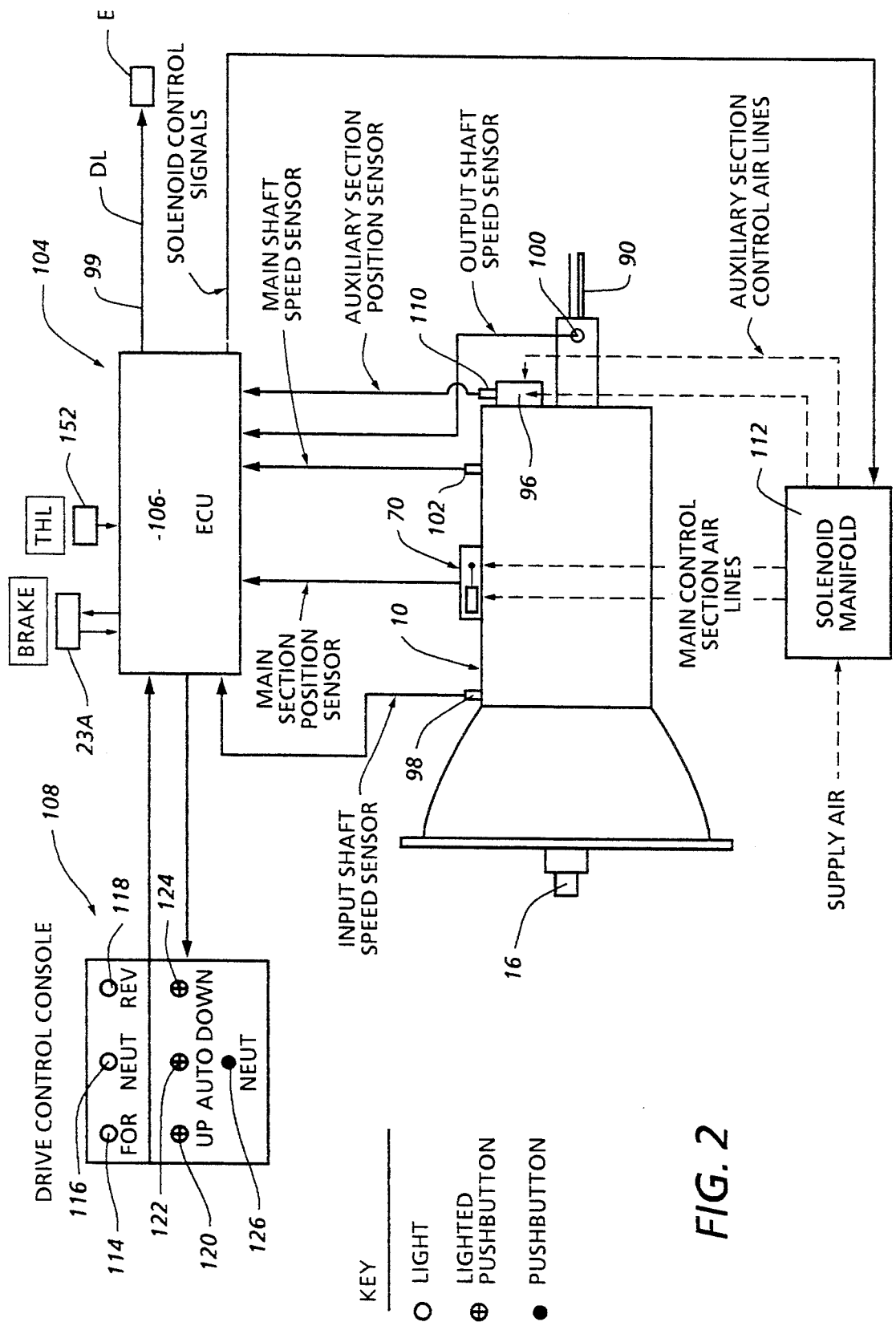
FIG. 2 is a schematic illustration of the automatic preselect and semi-automatic shift implementation system for a mechanical transmission system of the present invention.

The automatic preselect and semi-automatic shift implementation control system 104 for an automated mechanical transmission system of the present invention is schematically illustrated in FIG. 2. Control system 104, in addition to the mechanical transmission 10 described above, includes an electronic control unit 106, preferably microprocessor based, for receiving input signals, from the input shaft speed sensor 98, from the engine speed sensor 99, from the output shaft speed sensor 100 (or, alternatively, from the mainshaft speed sensor 102), from the shift actuators 70 and 96, from the driver control console 108, from a throttle pedal P position sensor 152 and/or from the engine E though data link DL. The ECU 106 may also receive inputs from an auxiliary section position sensor 110.

As discussed above, engine E is an electronically controlled engine accepting command signals over data link DL in conformity with a protocol such as CAN, SAE J 1922 and/or SAE J 1939. Thus, engine E may be controlled by varying fueling of the engine in one of four operating modes, namely:

(1) tracking the operator's setting of the throttle pedal;

(2) causing engine torque to equal a requested or target engine torque;

(3) causing engine speed (ES) to equal a requested or target engine speed; or (4) causing engine torque and engine speed to equal but not exceed requested engine torque and speed limits. When operating in the first mode, the operator is in control of the engine, while in the other modes, the fueling of the engine may not correspond to operator throttle setting. The process by which control of the engine is returned to the operator (i.e., returned to throttle tracking) is referred to as "throttle recovery."

The ECU 106 may be of the type illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, to the driver control console 108 and through the data link DL to engine E.

In the preferred embodiment, the driver control console allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection is made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

The display/control console also may be of the "R-N-D-H-L" type (i.e., reverse-neutral-drive-high-low) with a manual upshift and downshift selector.

In operation, to select upshifts and downshifts manually, the operator will depress either button 120 or button 124 as appropriate. The selected button will then be lighted until the selected shift is implemented or until the selection is cancelled.

Alternatively, at a given engine speed ES (such as above 1700 RPM) the upshift button may be lit and remain lit until an upshift is selected by pushing the button.

To implement a selected shift, the manifold 112 is preselected to cause actuator 70 to be biased to shift main transmission section 12 into neutral. This is accomplished by the ECU controller causing a torque reversal by manually momentarily decreasing and/or increasing the supply of fuel to the engine. As the transmission is shifted into neutral, and neutral is verified by the ECU (neutral sensed for a period of time such as 1.5 seconds), the neutral condition indicia button 116 is lighted. If the selected shift is a compound shift, i.e., a shift of both the main section 12 and of the range section 14, such as a shift from 4th to 5th speeds as seen in FIG. 1 A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of engine speeds (ES) and input shaft speeds, based upon sensed output shaft (vehicle) speed and the ratio to be engaged (GR target), which will result in an acceptably synchronous engagement of the ratio to be engaged. As the ECU, by issuing commands to the engine over data link DL, causes the engine speed and input shaft speed to fall within the acceptable range, the ECU 106 will issue command output signals to manifold 112 to cause actuator 70 to engage the mainsection ratio to be engaged.

In the automatic preselection mode of operation, selected by use of lighted pushbutton 122, the ECU will, based upon stored logic rules, currently engaged ratio (which may be calculated by comparing input shaft to output shaft speed), output shaft or vehicle speed and-/or throttle pedal position determine if an upshift or a downshift is required and select same.

Assuming the automatic selection mode of operation of the automated mechanical transmission system of FIG. 2, if a downshift is being or is about to be implemented due to decreasing vehicle speed and if (1) the transmission is in one of the upper gear ratios ($GR \geq 4$), (2) the throttle pedal is only minimally displaced (THL<5% of full throttle), (3) cruise control, if available, is not active, this is considered, for purposes of this invention, a "non-power downshift." Vehicle slowing in the lower ratios ($GR \geq 3$) occurs at speeds just above stopping and often does not require a sequential downshifting to even lower ratios.

Upon determining that, for example, a non-power eighth-speed-to-seventh-speed downshift is required, the ECU will command an increase/decrease of engine fueling to cause a driveline torque break, allowing jaw clutch 60 to disengage gear 24/input shaft 16 and move to its neutral position (see, for example, U.S. Pat. No. 4,850,236, the disclosure of which is incorporated herein by reference).

Upon determining that clutch 60 has disengaged gear 24 and that the transmission 10 is in neutral, the ECU 106 will request over data link DL that the engine E, in its speed control mode of operation, achieve a synchronous speed for engaging seventh gear ($ES=IS=OS * GR_{7TH}$) which, as is known, equals input shaft speed (IS) with master clutch C fully engaged and will equal the gear ratio of the target gear ($GR_{7TH}$) multiplied by current output shaft speed (OS). Assuming substantially constant vehicle speed and, thus, output shaft speed, during the shift transient, a downshift requires an increase in engine speed to achieve substantially synchronous conditions and, thus, fueling of engine E will increase.

Upon sensing over data link DL and/or from sensors 98 or 99 that engine speed has been increased to the synchronous speed for engaging seventh gear, the ECU will cause the transmission actuator to move clutch 60 rearwardly to engage mainshaft gear 50. Upon sensing engagement of gear 50 by clutch 60, the downshift from eighth to seventh speed has been completed and the throttle recovery sequence must be initiated to return control of the engine to the operator (i.e., return to the throttle tracking mode of engine operation).

As the just-completed shift was a non-power downshift, the operator is requesting only minimal fuel and the engine has been fueled by the engine controller at a relatively high rate to rapidly increase the engine speed to the target synchronous speed. If fueling were now immediately returned to the throttle tracking mode, a harsh shift and/or cab lurch would be a likely result. Also, as at minimal throttle position there is a minimal engine torque requirement, operation in the torque control mode is not appropriate.

Applicant has discovered that shift quality is improved after a non-power downshift if the throttle recovery operation is performed with the engine operating in its speed control mode and with the target engine speed having a value which is continuously, downwardly ramped from an initial value of about OS * GR until the target value is less than actual engine speed ($ES=IS=OS * GR$) by a predetermined value (i.e., until (OS * GR)—$ES_{TARGET}>$REF), at which point engine control is switched to the throttle tracking mode and the throttle recovery operation is completed.

Actual engine speed ($ES=OS * GR$) exceeding the target value by a reference (such as about 200 RPM for a heavy-duty vehicular diesel engine) during a recovery from a non-power downshift is an indication that the vehicle is now driving the engine and that allowing fuel control to track throttle position will not adversely affect shift quality.

In practice, for heavy-duty trucks and tractor-semitrailer vehicles equipped with diesel engines and 9-, 10-, 12-, 13- or 18-forward-speed automated mechanical transmissions, good results have been obtained by performing the non-power downshift throttle recovery algorithm loop every 10–20 milliseconds, decrementing the target engine speed ($ES_{TARGET}$) about 3 RPM each loop and setting the reference value at about 100–200 RPM.

There are two general types of non-power downshifts, namely, coasting downshifts (when brakes or other retarding devices are not in use) and braking downshifts (when brakes or other retarding devices are in use). Braking downshifts may be sensed by sensors such as sensor 23A, by monitoring signals to or from various actuators or by comparing vehicle deceleration (dOS/dt) to a reference value. The implementation of the nonpower downshift throttle recovery control of the present invention for braking downshifts is slightly different than the implementation for coasting downshifts to assure that the engine is not fighting the vehicle retarding devices.

In the coasting downshift throttle recovery mode, current target engine speed ($ES_{TARGET}$) equals previous target engine speed minus a decrement value (about 3 RPM). Preferably, the target is decremented once every 10–20 milliseconds in the braking downshift throttle recovery mode, and target engine speed equals actual engine speed (OS × GR) reduced by (1) a factor related to sensed vehicle deceleration (dOS/dt) and (2) the decrement value (i.e., $ES_{TARGET}=(OS * GR)-(-dOS/dr * constant)-(decrement\ value)$). If the target engine speed value for coasting downshifts is less than the target engine speed value for braking downshifts, a coasting downshift has occurred and the coasting downshift target engine speed value is utilized. If the braking downshift target engine speed value is less than the coasting downshift target engine speed value, a braking downshift has occurred and the braking downshift target engine speed value is utilized. The target engine speed value having the lower value is the target engine speed value requested on the data link DL.

Figure 3A:
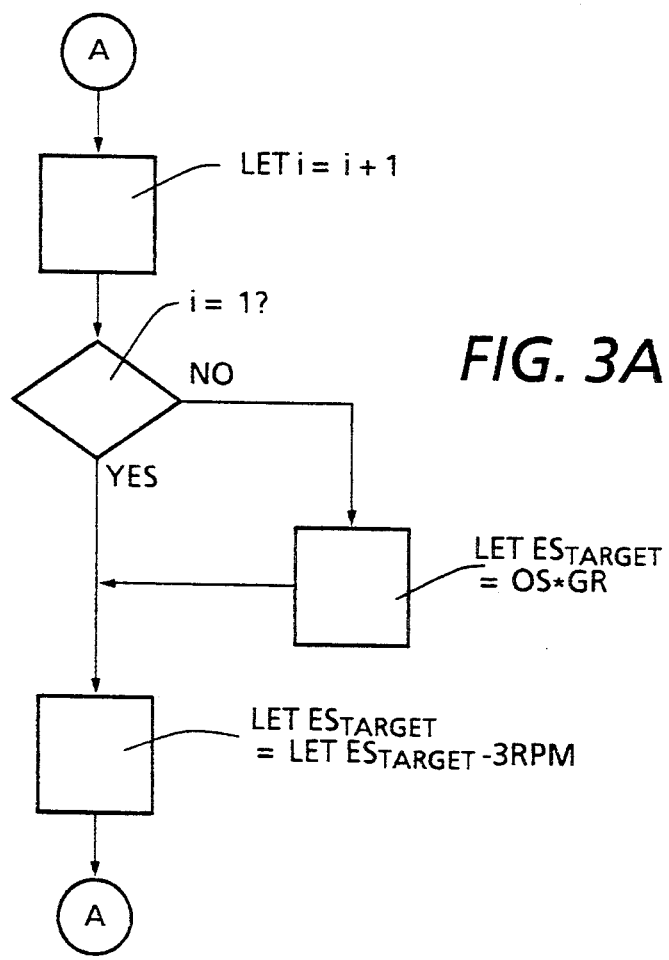
FIGS. 3 and 3A are schematic illustrations, in flow chart format, of the inventive control of the present invention.
Figure 3:
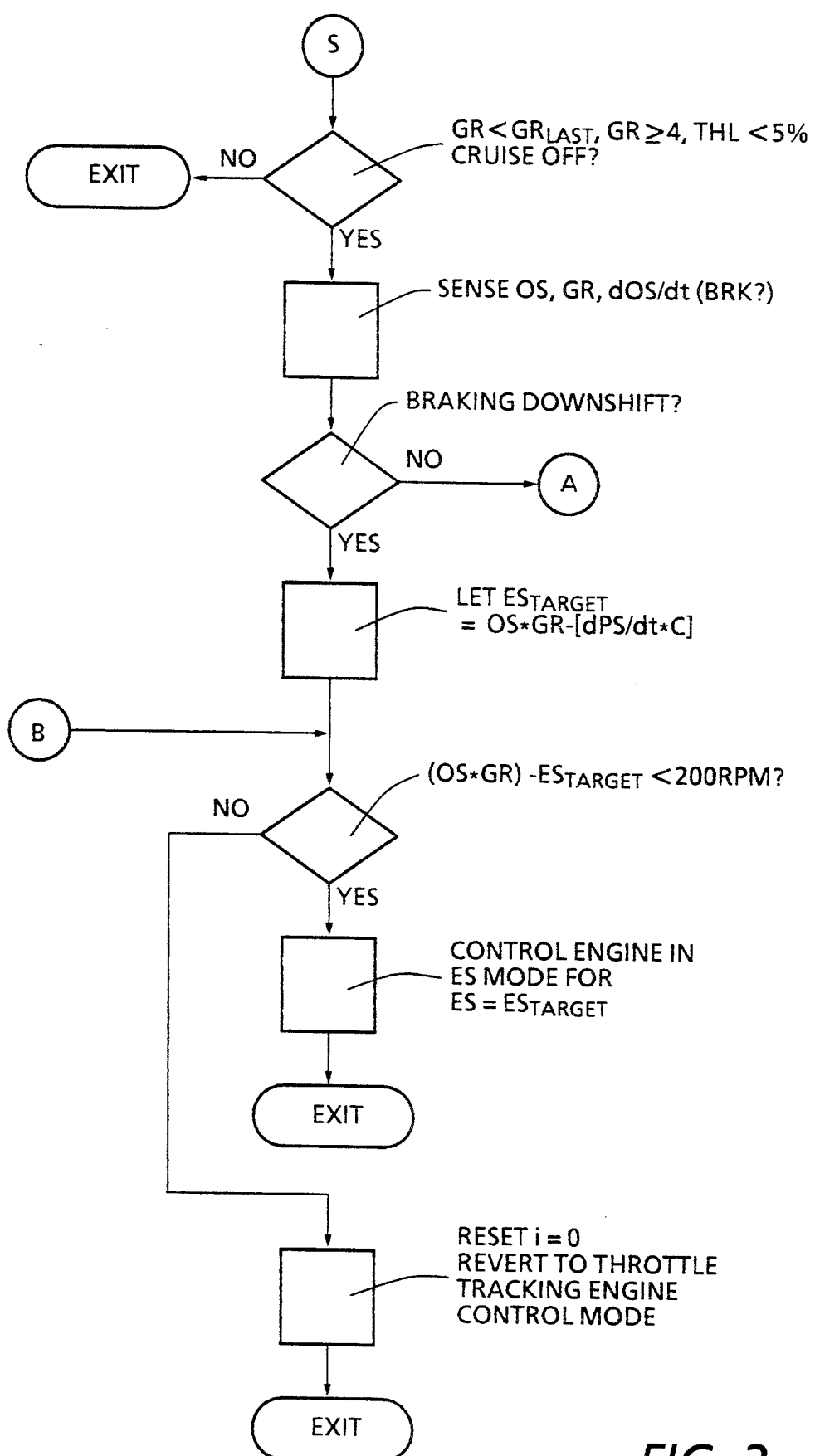
Figure 4:
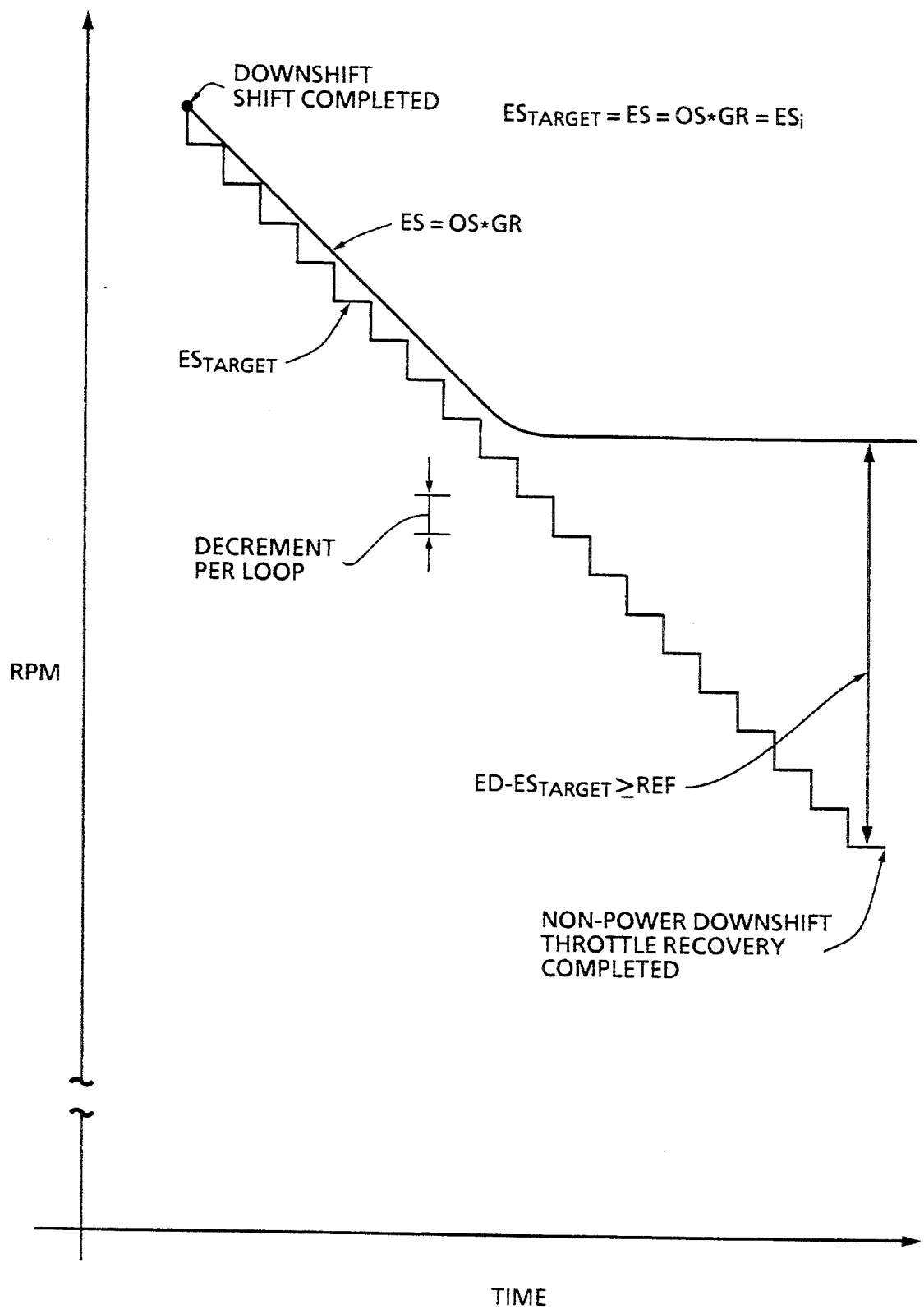
FIG. 4 is a graphical representation of the non-power downshift throttle control method of the present invention.

The non-power downshift throttle recovery control of the present invention is schematically illustrated, in flow chart format, in FIGS. 3 and 3A. A graphical representation of actual engine speed (ES=OS * GR) and target engine speed ($ES_{TARGET}$) during the non-power downshift throttle recovery operation of the present invention may be seen by reference to FIG. 4.

Accordingly, it may be seen that an effective non-power downshift throttle recovery control is provided for automated mechanical transmission systems of the type shifting without master clutch disengagement and including electronically controlled engines having at least a throttle tracking mode and an engine speed mode.

Although the present invention has been described with a certain degree of particularity, it is understood that various changes to form and detail may be made without departing from the spirit and the scope of the invention as hereinafter claimed.

I claim:

1. A non-power downshift throttle recovery control method for vehicular automated mechanical transmission systems of the type comprising an operator-actuated throttle device, a fuel-controlled engine (E), an electronic engine controller for controlling fueling of the engine in at least a first engine control mode wherein the engine is fueled in accordance with current operator setting of said throttle device and a second engine control mode wherein the engine is fueled to cause engine speed (ES) to equal a requested target engine speed ($ES_{TARGET}$), regardless of the setting of the throttle device, a multi-speed change gear mechanical transmission (10) having an input shaft (16) and an output shaft (90) adapted to drive vehicular drivewheels, a master friction clutch (C) drivingly interposed between the engine and the transmission, sensing means for providing input signals indicative of engine speed (ES), output shaft speed (OS) and engaged gear ratio (GR), a control unit (106) for receiving said input signals and processing same according to logic rules to issue command signals to said engine controller and a transmission actuator, said control unit causing said transmission to be shifted without disengagement of said master clutch, said method characterized by:

sensing completion of a non-power downshift;

causing the electronic engine controller to operate in said second control mode with a requested target engine speed ($ES_{TARGET}$) having a value continuously decrement downwardly from a value less than engine speed at completion of the non-power downshift ($ES_i$) until sensed engine speed (ES) exceeds said target engine speed by at least an engine speed difference value ($ES-ES_{TARGET} \geq REF$); and upon sensing that sensed engine speed exceeds said target engine speed by at least said reference value, causing the electronic engine controller to operate in said first control mode.

2. The method of claim 1 wherein sensing completion of a nonpower downshift comprises:

sensing engagement of a gear ratio lower than a previously engaged gear ratio and greater than a predetermined low gear ratio ($GR_{LOW}<GR<GR_{LAST}$); and sensing that operator's setting of said throttle device is less than a throttle reference value ($THL_{REF}$).

3. The method of claim 2 wherein said throttle reference value is about five percent (5%) of maximum throttle setting.

4. The method of claims 1, 2 or 3 wherein said target engine speed is decremented downwardly at a substantially constant rate.

5. The method of claim 4 wherein said substantially constant rate equals about 1–10 RPM per 10 milliseconds.

6. The method of claim 5 wherein said target engine speed value is decremented in a step-by-step manner once every 10–20 milliseconds.

7. The method of claims 1, 2 or 3 wherein said control unit is connected to said engine controller by means of a data link (DL) conforming to the SAE J 1922 or SAE J 1939 protocol.

8. The method of claim 4 wherein said control unit is connected to said engine controller by means of a data link (DL) conforming to the SAE J 1922 or SAE J 1939 protocol.

9. The method of claims 1,2 or 3 wherein said engine speed difference value (REF) equals about 100–200 RPM.

10. The method of claim 4 wherein said engine speed difference value (REF) equals about 100–200 RPM.

11. The method of claim 5 wherein said engine speed difference value (REF) equals about 100–200 RPM.

12. The method of claim 7 wherein said engine speed difference value (REF) equals about 100–200 RPM.

13. The method of claims 1, 2 or 3 wherein said system does not include a master clutch actuator operated by said controller.

14. The method of claims 1, 2 or 3 additionally comprising sensing for application of vehicle retarding devices during said non-power downshift and, upon sensing application of vehicle retarding devices during said non-power downshift, causing said target engine speed to be additionally decremented downwardly by an amount determined as a function of current vehicle deceleration.

15. The method of claim 4 additionally comprising sensing for application of vehicle retarding devices during said non-power downshift and, upon sensing application of vehicle retarding devices during said non-power downshift, causing said target engine speed to be additionally decremented downwardly by an amount determined as a function of current vehicle deceleration.

16. The method of claim 14 wherein said system includes a sensor (23A) for providing an input signal indicative of application of vehicle retarding devices.

17. The method of claim 14 wherein application of vehicle retarding devices is determined as a function of current vehicle deceleration (dOS/dr).

18. The method of claim 15 wherein said system includes a sensor (23A) for providing an input signal indicative of application of vehicle retarding devices.

19. The method of claim 15 wherein application of vehicle retarding devices is determined as a function of current vehicle deceleration.

20. The method of claims 1, 2 or 3 wherein (1) a coasting downshift target engine speed value ($ES_{TCD}$) equal to initial engine speed ($ES_i$) continuously decremented downwardly at a predetermined value and, (2) a braking downshift target engine speed value ($ES_{TBD}$) equal to current engine speed continuously decremented downwardly by (i) a value determined as a function of current vehicle deceleration and (ii) said predetermined value, are determined and said target engine speed is selected as the lesser of said coasting downshift target engine speed value and said braking downshift target engine speed value.

21. The method of claim 4 wherein (1) a coasting downshift target engine speed value ($ES_{TCD}$) equal to initial engine speed ($ES_i$) continuously decremented downwardly at a predetermined value and, (2) a braking downshift target engine speed value ($ES_{TBD}$) equal to current engine speed continuously decremented downwardly by (i) a value determined as a function of current vehicle deceleration and (ii) said predetermined value, are determined and said target engine speed is selected as the lesser of said coasting downshift target engine speed value and said braking downshift target engine speed value.

22. A non-power downshift throttle recovery control system for vehicular automated mechanical transmission systems of the type comprising an operator-actuated throttle device, a fuel-controlled engine (E), an electronic engine controller for controlling fueling of the engine in at least a first engine control mode wherein the engine is fueled in accordance with current operator setting of said throttle device and a second engine control mode wherein the engine is fueled to cause engine speed (ES) to equal a requested target engine speed ($ES_{TARGET}$), regardless of the setting of the throttle device, a multi-speed change gear mechanical transmission (10) having an input shaft (16) and an output shaft (90) adapted to drive vehicular drivewheels, a master friction clutch (C) drivingly interposed between the engine and the transmission, sensing means for providing input signals indicative of engine speed (ES), output shaft speed (OS) and engaged gear ratio (GR), a control unit (106) for receiving said input signals and processing same according to logic rules to issue command signals to said engine controller and a transmission actuator, said control unit causing said transmission to be shifted without disengagement of said master clutch, said control system characterized by:

means for sensing completion of a non-power downshift;

means for causing the electronic engine controller to operate in said second control mode with a requested target engine speed ($ES_{TARGET}$) having a value continuously decrement downwardly from a value less than engine speed at completion of the non-power downshift ($ES_i$) until sensed engine speed (ES) exceeds said target engine speed by at least a reference value ($ES - ES_{TARGET} \geq -REF$); and means, upon sensing that sensed engine speed exceeds said target engine speed by at least said reference value, for causing the electronic engine controller to operate in said first control mode.

23. The control system of claim 22 wherein said means for sensing completion of a non-power downshift comprises:

means for sensing engagement of a gear ratio lower than a previously engaged gear ratio and greater than a predetermined low gear ratio ($GR_{LOW} < GR < GR_{LAST}$); and means for sensing that operator's setting of said throttle device is less than a throttle reference value ($THL_{REF}$).

24. The control system of claim 23 wherein said throttle reference value is about five percent (5%) of maximum throttle setting.

25. The control system of claim 22 wherein said control unit is connected to said engine controller by means of a data link (DL) conforming to the SAE J 1922 or SAE J 1939 protocol.

26. The control system of claims 22 or 23 wherein said engine speed difference value (REF) equals about 100–200 RPM.

27. The control system of claim 23, additionally comprising means for sensing application of vehicle retarding devices during said non-power downshift and, upon sensing application of vehicle retarding devices during said non-power downshift, for causing said target engine speed to be additionally decremented downwardly by an amount determined as a function of current vehicle deceleration.

28. The control system of claim 27 wherein said system includes a sensor (23A) for providing an input signal indicative of application of vehicle retarding devices.

29. The control system of claim 27 wherein application of vehicle retarding devices is determined as a function of current vehicle deceleration (dOS/dt).

30. The control system of claim 23 wherein (1) a coasting downshift target engine speed value ($ES_{TCD}$) equal to initial engine speed ($ES_i$) continuously decremented downwardly at a predetermined value and, (2) a braking downshift target engine speed value ($ES_{TBD}$) equal to current engine speed continuously decremented downwardly by (i) a value determined as a function of current vehicle deceleration and (ii) said predetermined value, are determined and said target engine speed is selected as the lesser of said coasting downshift target engine speed value and said braking downshift target engine speed value.

* * * * *